(12) United States Patent
Imai et al.

(10) Patent No.: US 12,051,287 B2
(45) Date of Patent: Jul. 30, 2024

(54) INSPECTION ASSISTANCE PROGRAM, INSPECTION ASSISTANCE SYSTEM, AND INSPECTION ASSISTANCE APPARATUS CONTROL METHOD

(71) Applicant: ISUZU MOTORS LIMITED, Tokyo (JP)

(72) Inventors: Akira Imai, Fujisawa (JP); Yusuke Sakakibara, Fujisawa (JP); Masakazu Ishimaru, Fujisawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 339 days.

(21) Appl. No.: 17/618,824

(22) PCT Filed: Jun. 11, 2020

(86) PCT No.: PCT/JP2020/022959
§ 371 (c)(1),
(2) Date: Dec. 13, 2021

(87) PCT Pub. No.: WO2020/250959
PCT Pub. Date: Dec. 17, 2020

(65) Prior Publication Data
US 2022/0358799 A1    Nov. 10, 2022

(30) Foreign Application Priority Data
Jun. 13, 2019 (JP) ................. 2019-110526

(51) Int. Cl.
*G07C 5/08* (2006.01)
*G07C 5/00* (2006.01)
*H04W 4/48* (2018.01)

(52) U.S. Cl.
CPC ........... *G07C 5/0825* (2013.01); *G07C 5/008* (2013.01); *G07C 5/0808* (2013.01); *H04W 4/48* (2018.02)

(58) Field of Classification Search
CPC .... G07C 5/0825; G07C 5/008; G07C 5/0808; H04W 4/48
(Continued)

(56) References Cited

U.S. PATENT DOCUMENTS

2005/0256681 A1* 11/2005 Brinton ................. G06Q 10/06
                                                                702/182
2006/0109139 A1*  5/2006 Katsuta .................. B60R 25/24
                                                                 455/39
2019/0318549 A1* 10/2019 Zeira ...................... G07C 5/006

FOREIGN PATENT DOCUMENTS

EP         2990774 A1    3/2016
JP      2005-016949 A    1/2005
(Continued)

OTHER PUBLICATIONS

Patent Cooperation Treaty, International Search Report, Application No. PCT/JP2020/022959, dated Sep. 8, 2020, in 5 pages.
(Continued)

*Primary Examiner* — Mahmoud S Ismail
(74) *Attorney, Agent, or Firm* — PROCOPIO, CORY, HARGREAVES & SAVITCH LLP (57) ABSTRACT

This inspection assistance program is a program for assisting inspection of a vehicle, and causes an inspection assistance apparatus 2 to function as: a registration information acquisition unit 251 that acquires vehicle registration information corresponding to the vehicle; a determination unit 252 that determines whether wireless identification information for identifying an on-vehicle wireless machine installed in the vehicle is associated with the vehicle registration information; and a display control unit 253 that causes a display unit
(Continued)

23 to display an operation screen that is generated in a mode determined on the basis of the determination result of the determination unit 252 and that is used for inspecting the vehicle through communication with the on-vehicle wireless machine.

7 Claims, 11 Drawing Sheets

(58) Field of Classification Search
USPC .......................................................... 701/31.4
See application file for complete search history.

(56) References Cited

FOREIGN PATENT DOCUMENTS

| | | |
|---|---|---|
| JP | 2011-185727 A | 9/2011 |
| JP | 2014-215052 A | 11/2014 |
| JP | 2015-009630 A | 1/2015 |

OTHER PUBLICATIONS

Patent Cooperation Treaty, Written Opinion, Application No. PCT/JP2020/022959, dated Sep. 8, 2020, in 3 pages.
German Patent and Trademark Office, Office Action, Application No. DE 11 2020 002 817.8, dated Jan. 22, 2024, in 13 pages.
Car Scanner ELM OBD2, URL: https://www.carscanner.info/wifi/ archived in http://www.archive.org on Jun. 11, 2019 [retrieved on Jan. 11, 2024].

\* cited by examiner

| VEHICLE REGISTRATION INFORMATION | WIRELESS IDENTIFICATION INFORMATION | VEHICLE IDENTIFICATION NUMBER |
|---|---|---|
| SHINAGAWA XXX I YYY | 123ABC | DEF987 |
| SHINAGAWA XXX II ZZZ | — | — |
| ⋮ | ⋮ | ⋮ |

INSPECTION ASSISTANCE PROGRAM, INSPECTION ASSISTANCE SYSTEM, AND INSPECTION ASSISTANCE APPARATUS CONTROL METHOD

CROSS-REFERENCE TO RELATED APPLICATIONS

This application is US National Stage of International Patent Application PCT/JP2020/022959, filed Jun. 11, 2020, which claims benefit of priority from Japanese Patent Application JP2019-110526, filed Jun. 13, 2019, the contents of both of which are incorporated herein by reference.

TECHNICAL FIELD

The present disclosure relates to an inspection assistance program, an inspection assistance system, and a control method for an inspection assistance apparatus, in which the inspection assistance program, the inspection assistance system, and the inspection assistance apparatus assist inspection of a vehicle.

BACKGROUND ART

There is disclosed a technique of storing an inspection result input to a terminal carried by an inspection worker of an automobile in an apparatus different from the terminal carried by the inspection worker via data communication (for example, see Patent Literature 1).

CITATION LIST

Patent Literature

Patent Literature 1: JP-A-2015-009630

SUMMARY OF INVENTION

Technical Problem

When the terminal carried by the inspection worker and the apparatus that stores the inspection result are not communicably connected to each other, the inspection result cannot be stored via the data communication. Therefore, it is necessary to check whether the terminal carried by the inspection worker and the terminal that stores the inspection result are communicably connected to each other before inspection work is performed, and efficiency of the inspection work is reduced.

Therefore, the present disclosure has been made in view of these points, and an object thereof is to provide a technique for improving the efficiency of the inspection work.

Solution to Problem

According to a first aspect of the present disclosure, there is provided an inspection assistance program. The inspection assistance program is a program for assisting inspection of a vehicle, the inspection assistance program causing a computer to function as: a registration information acquisition unit configured to acquire vehicle registration information corresponding to the vehicle; a determination unit configured to determine whether wireless identification information for identifying an in-vehicle wireless device of the vehicle is associated with the vehicle registration information; and a display control unit configured to cause a display unit to display an operation screen that is created in a mode determined based on a determination result of the determination unit and that is used for inspecting the vehicle by communicating with the in-vehicle wireless device.

The display control unit may cause the display unit to display the operation screen including an input screen of the wireless identification information when the determination unit determines that the wireless identification information is not associated with the vehicle registration information.

The registration information acquisition unit may acquire a vehicle identification number for identifying the vehicle from an in-vehicle wireless device when the in-vehicle wireless device identified by the input wireless identification information and the computer are communicably connected to each other.

The display control unit may cause the display unit to display the operation screen including a wireless setting operation unit for communicably connecting the in-vehicle wireless device and the computer.

The display control unit may cause the display unit to display the operation screen not including the wireless setting operation unit on condition that the in-vehicle wireless device and the computer are communicably connected to each other.

The display control unit may cause the display unit to display a change screen for changing the wireless identification information on condition that the wireless identification information is associated with the vehicle registration information.

According to a second aspect of the present disclosure, there is provided an inspection assistance system for assisting inspection of a vehicle, the inspection assistance system including: a registration information acquisition unit configured to acquire vehicle registration information corresponding to the vehicle; a determination unit configured to determine whether wireless identification information for identifying an in-vehicle wireless device of the vehicle is associated with the vehicle registration information; and a display control unit configured to cause an information terminal of a user who inspects the vehicle to display an operation screen that is created in a mode determined based on a determination result of the determination unit and that is used for inspecting the vehicle by communicating with the in-vehicle wireless device.

According to a third aspect of the present disclosure, there is provided a control method for an inspection assistance apparatus for assisting inspection of a vehicle, the control method including: causing the inspection assistance apparatus to execute acquiring vehicle registration information corresponding to the vehicle; determining whether wireless identification information for identifying an in-vehicle wireless device of the vehicle is associated with the vehicle registration information; and causing a display unit to display an operation screen that is created in a mode determined based on the determination result and that is used for inspecting the vehicle by communicating with the in-vehicle wireless device.

According to a fourth aspect of the present disclosure, there is provided a computer-readable storage medium that stores a program that causes a computer to execute a processing for assisting inspection of a vehicle, the processing including: acquiring vehicle registration information corresponding to the vehicle; determining whether wireless identification information for identifying an in-vehicle wireless device of the vehicle is associated with the vehicle registration information; and causing a display unit to display an operation screen that is created in a mode determined based on a determination result of the determination unit and that is used for inspecting the vehicle by communicating with the in-vehicle wireless device.

Advantageous Effects of Invention

According to the present disclosure, there is an effect that efficiency of inspection work is improved.

DESCRIPTION OF EMBODIMENTS

[Overview of Inspection Assistance System S]

Figure 1:
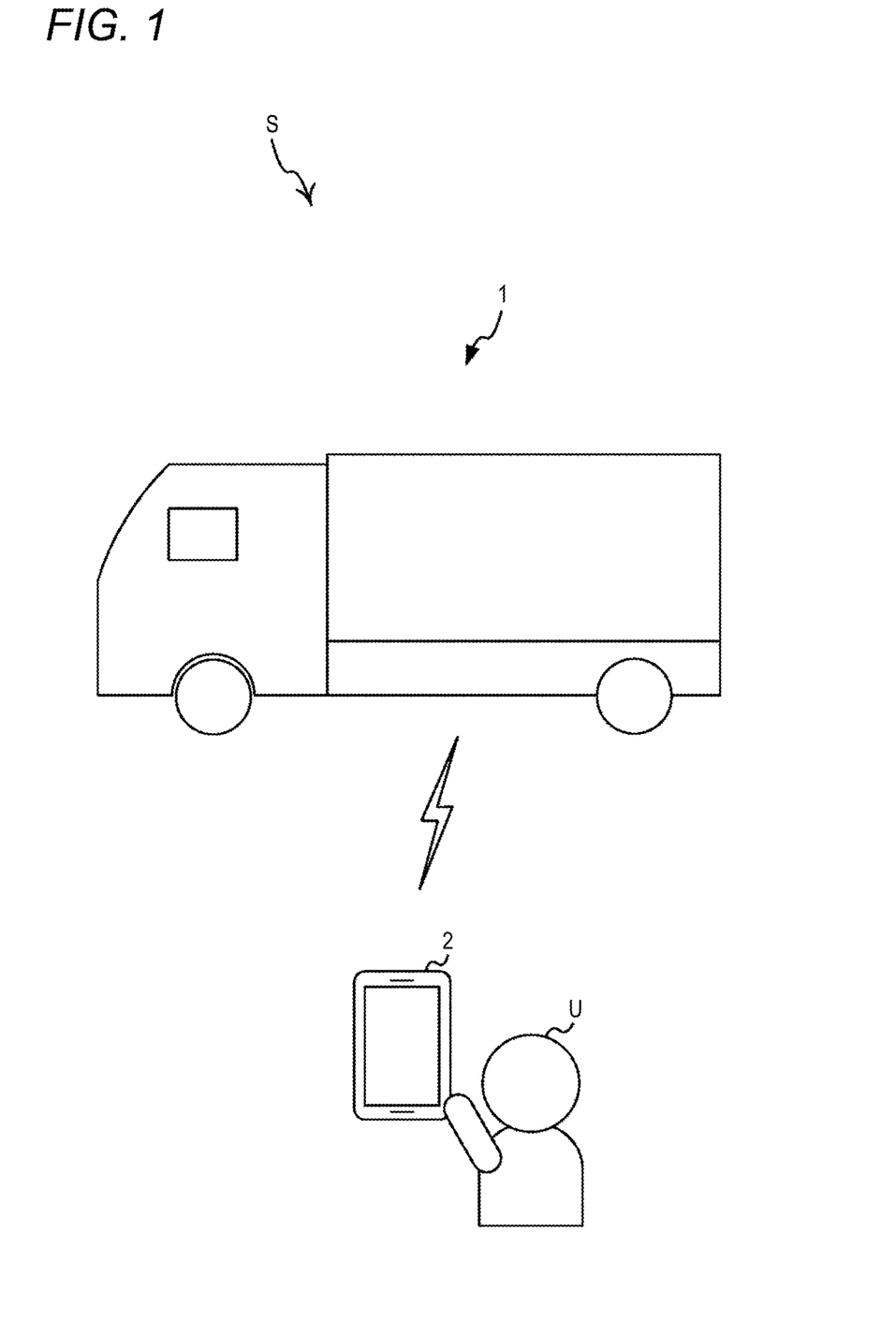
FIG. 1 is a diagram showing a configuration of an inspection assistance system of an embodiment.

FIG. 1 is a diagram showing a configuration of an inspection assistance system S according to an embodiment. The inspection assistance system S includes an inspection assistance apparatus 2 for assisting inspection of a vehicle 1. The vehicle 1 is a commercial vehicle, and is, for example, a truck. The inspection assistance apparatus 2 is an apparatus managed by a business operator who inspects the vehicle 1, and is, for example, an information terminal such as a smartphone or a tablet.

When an inspection application software (hereinafter, referred to as "inspection application") is activated, the inspection assistance apparatus 2 displays an inspection item and an inspection method necessary for inspection of the vehicle 1 on a display. The inspection assistance apparatus 2 receives an operation of a user U who inputs an inspection result.

The inspection assistance apparatus 2 communicates with the vehicle 1 by wireless communication via an in-vehicle wireless device mounted on the vehicle 1. For example, the inspection assistance apparatus 2 communicates with the vehicle 1 by Wi-Fi (registered trademark) or Bluetooth (registered trademark). The inspection assistance apparatus 2 transmits, for example, instruction information for changing a state of equipment of the vehicle 1 to the vehicle 1 by wireless communication.

Figure 2:
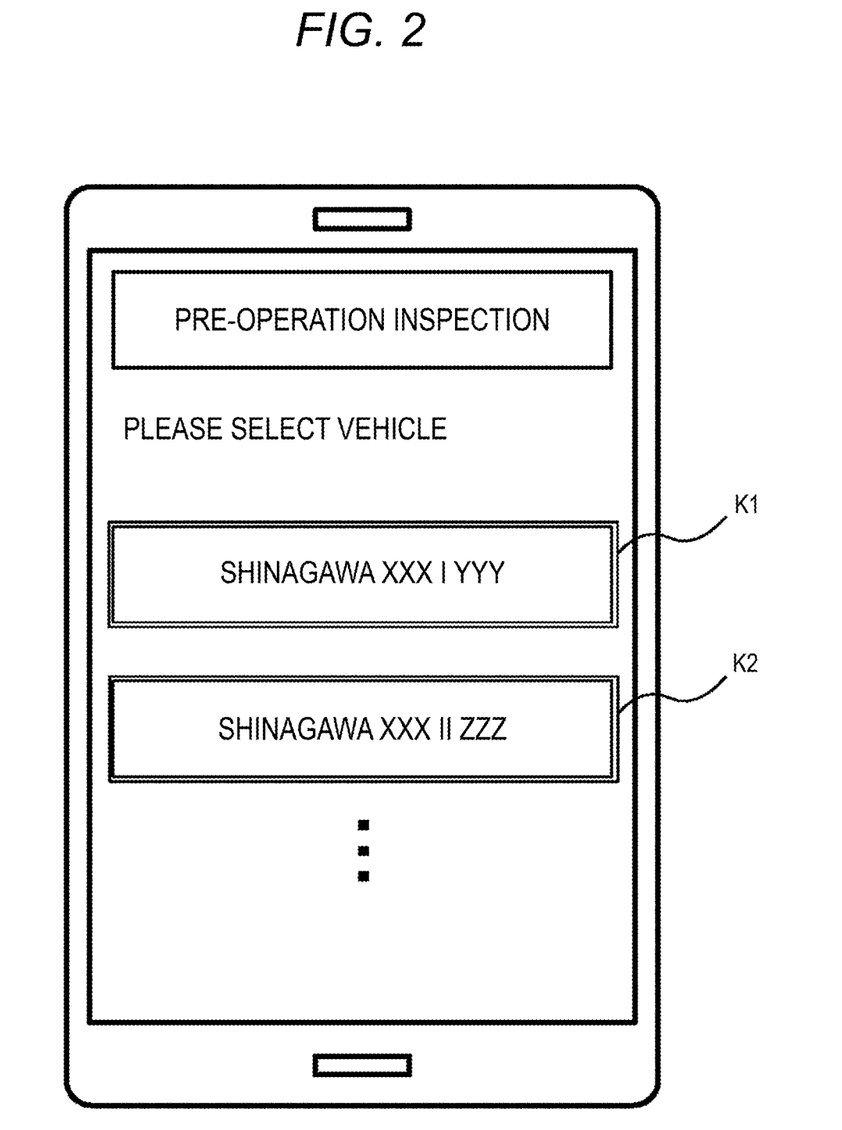
FIG. 2 is a diagram showing a screen displayed by an inspection assistance apparatus immediately after an inspection application is activated.

FIG. 2 is a diagram showing a screen displayed by the inspection assistance apparatus 2 immediately after the inspection application is activated. As shown in FIG. 2, the inspection assistance apparatus 2 displays a screen for selecting the vehicle 1 to be inspected. In the example of FIG. 2, an operation key K1 for selecting a vehicle with vehicle registration information of "Shinagawa XXX I YYY" and an operation key K2 for selecting a vehicle with vehicle registration information of "Shinagawa XXX II ZZZ" are displayed. The vehicle registration information is information for identifying the vehicle 1, and is registered in advance by, for example, an administrator of the inspection assistance system S. For example, the vehicle registration information is an automobile registration number of the vehicle 1.

When an operation of selecting the vehicle 1 is performed in the screen of FIG. 2, an inspection item necessary for inspection of the selected vehicle 1 is displayed. The user U performs inspection corresponding to the displayed inspection item, and inputs an inspection result to the inspection assistance apparatus 2. Further, when an inspection item to be inspected by changing a state of equipment of the vehicle 1 is displayed, the inspection assistance apparatus 2 transmits instruction information for changing the state of the equipment corresponding to the inspection item to the vehicle 1. In this way, the user U can inspect the vehicle 1 without directly operating the vehicle 1.

[Configuration of Vehicle 1]

Figure 3:
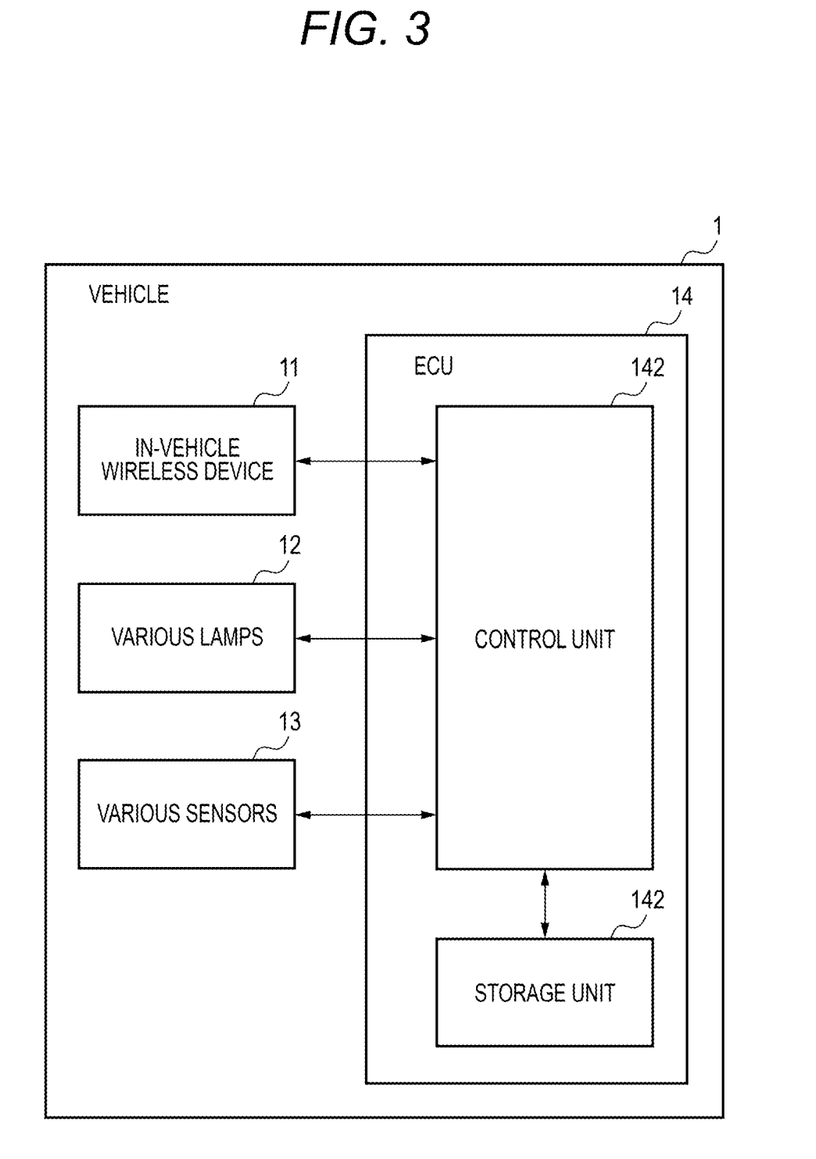
FIG. 3 is a diagram showing a configuration of a vehicle.

FIG. 3 is a diagram showing a configuration of the vehicle 1. The vehicle 1 includes an in-vehicle wireless device 11, various lamps 12, various sensors 13, and an electronic control unit (ECU) 14. The ECU 14 includes a storage unit 141 and a control unit 142.

The in-vehicle wireless device 11 is a device for communicating with the inspection assistance apparatus 2 by wireless communication. The in-vehicle wireless device 11 transmits information notified from the control unit 142 to the inspection assistance apparatus 2. Further, the in-vehicle wireless device 11 notifies the control unit 142 of information received from the inspection assistance apparatus 2. The in-vehicle wireless device 11 may transmit the information notified from the control unit 142 to an apparatus other than the inspection assistance apparatus 2 (for example, a server).

The various lamps 12 include, for example, a brake lamp, a backlight, and the like. The various sensors 13 include, for example, a sensor for detecting depression of a brake pedal, a sensor for detecting that gear is put into reverse, and the like.

The ECU 14 is a control device for electronically controlling units of the vehicle 1 by a computer. The storage unit 141 is configured with, for example, a read only memory (ROM) and a random access memory (RAM). The storage unit 141 stores various programs and various types of data for causing the control unit 142 to function.

The control unit 142 controls each unit of the vehicle 1 by executing a program stored in the storage unit 141. For example, the control unit 142 turns on or turns off the various lamps 12 based on information received from the inspection assistance apparatus 2 via the in-vehicle wireless device 11. Further, the control unit 142 transmits information, which is created based on detection results detected by the various sensors 13, to the inspection assistance apparatus 2 via the in-vehicle wireless device 11.

[Configuration of Inspection Assistance Apparatus 2]

Figure 4:
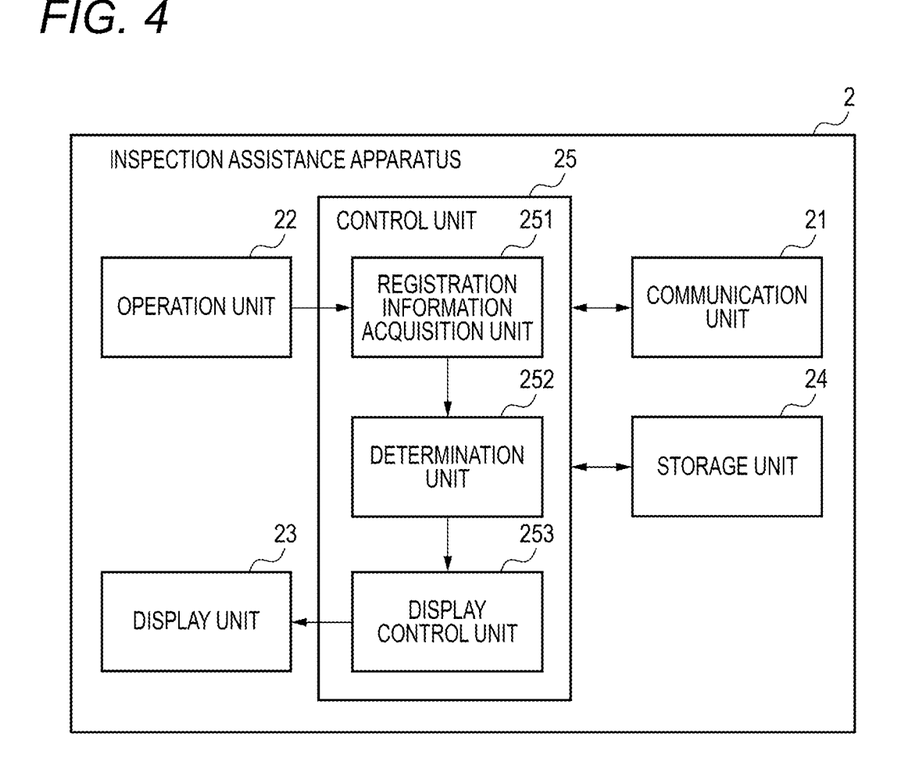
FIG. 4 is a diagram showing a configuration of the inspection assistance apparatus.

FIG. 4 is a diagram showing a configuration of the inspection assistance apparatus 2. The inspection assistance apparatus 2 includes a communication unit 21, an operation unit 22, a display unit 23, a storage unit 24, and a control unit 25. The communication unit 21 is a communication module for communicating with the vehicle 1 by wireless communication.

The operation unit 22 receives an operation performed by the user U. The operation unit 22 includes various buttons of the inspection assistance apparatus 2 and a touch panel provided to overlap the display unit 23. The operation unit 22 detects that the user U performs an operation, and notifies the control unit 25 of detected operation content. The display unit 23 is a display that displays various screens, and is, for example, a liquid crystal display.

The storage unit 24 is configured with, for example, a ROM and a RAM. The storage unit 24 stores various programs for causing the control unit 25 to function. Further, the storage unit 24 stores the vehicle registration information, a wireless identification number, and a vehicle identification number in association with one another.

The wireless identification information is information for identifying the in-vehicle wireless device 11 of the vehicle 1. For example, the information for identifying the in-vehicle wireless device 11 is a service set identifier (SSID) of the in-vehicle wireless device 11. The wireless identification information may include an encryption key for connecting to the in-vehicle wireless device 11. The vehicle identification number is a number unique to the vehicle 1 for identifying the vehicle 1, and is, for example, a vehicle identification number.

Figure 5:
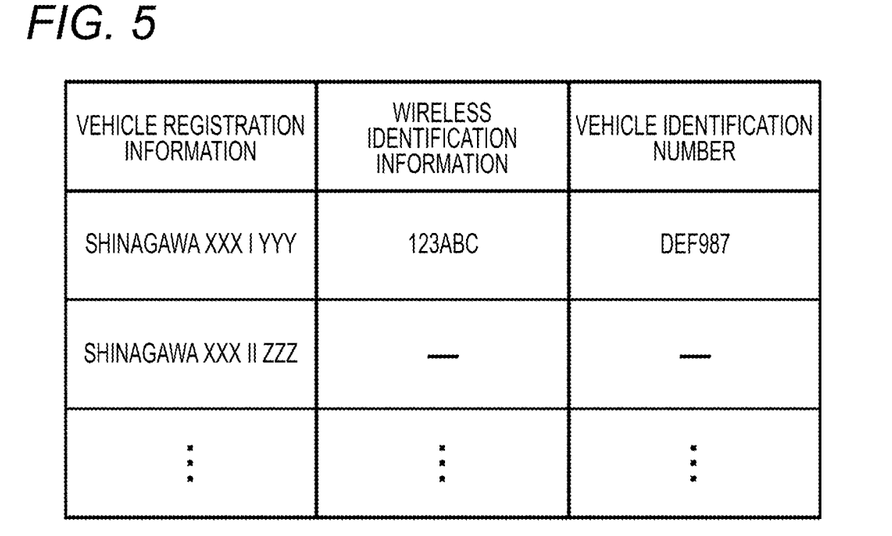
FIG. 5 is a schematic diagram of a data table in which vehicle registration information, a wireless identification number, and a vehicle identification number are associated with one another.

FIG. 5 is a schematic diagram of a data table in which the vehicle registration information, the wireless identification number, and the vehicle identification number are associated with one another. In the example of FIG. 5, the vehicle registration information "Shinagawa XXX I YYY" is associated with the wireless identification information "123ABC" and the vehicle identification number "DEF987". The storage unit 24 may store the vehicle registration information and an inspection item necessary for inspection of the vehicle 1 corresponding to the vehicle registration information in association with each other.

The control unit 25 includes a processor such as a central processing unit (CPU). The control unit 25 functions as a registration information acquisition unit 251, a determination unit 252, and a display control unit 253 by executing a program stored in the storage unit 24.

The registration information acquisition unit 251 acquires vehicle registration information corresponding to the vehicle 1 to be inspected. For example, the registration information acquisition unit 251 acquires vehicle registration information selected by the user U from a plurality of pieces of vehicle registration information displayed on the display unit 23.

The determination unit 252 refers to the data table in which the vehicle registration information, the wireless identification number, and the vehicle identification number stored in the storage unit 24 are associated with one another, and determines whether the wireless identification information is associated with the vehicle registration information acquired by the registration information acquisition unit 251. In a case of the example shown in FIG. 5, the determination unit 252 determines that the wireless identification information "123ABC" is associated with the vehicle registration information "Shinagawa XXX I YYY". In the example of FIG. 5, the determination unit 252 determines that the wireless identification information is not associated with the vehicle registration information "Shinagawa XXX II ZZZ".

Figure 6:
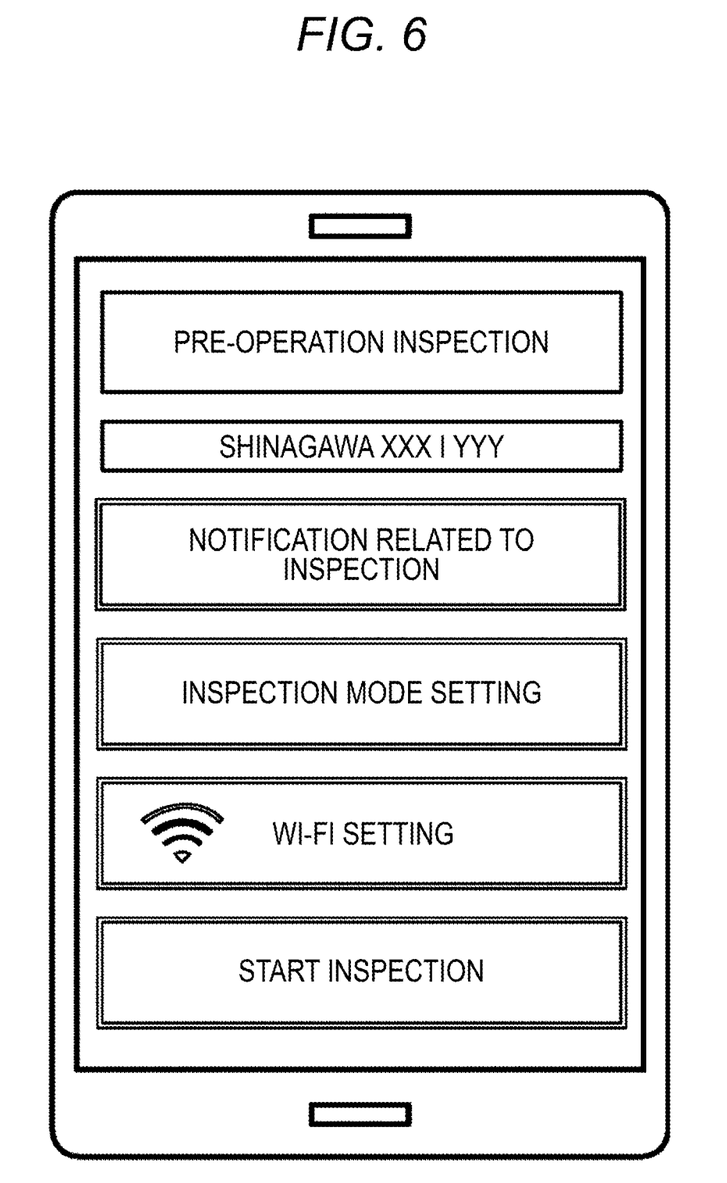
FIG. 6 is a schematic diagram showing an example of an operation screen.

The display control unit 253 displays an operation screen created in a mode determined based on a determination result of the determination unit 252. For example, when the determination unit 252 determines that the wireless identification information is associated with the acquired vehicle registration information, the display control unit 253 causes the display unit 23 to display an operation screen used for inspecting the vehicle 1 by communicating with the in-vehicle wireless device 11. Further, the display control unit 253 may cause an operation screen to be displayed. The operation screen includes information indicating that wireless setting for performing wireless communication with the in-vehicle wireless device 11 of the vehicle 1 corresponding to the selected vehicle registration information has been ended. FIG. 6 is a schematic diagram showing an example of the operation screen. Then, the display control unit 253 causes an inspection item associated with the vehicle registration information to be displayed when an "inspection start" key for starting the inspection of the vehicle is selected.

After receiving input of an inspection result for the displayed inspection item, the display control unit 253 causes an inspection item for which input of an inspection result has not been received to be displayed. In this way, the inspection assistance apparatus 2 can prevent the user U from forgetting to input an inspection result.

Figure 7:
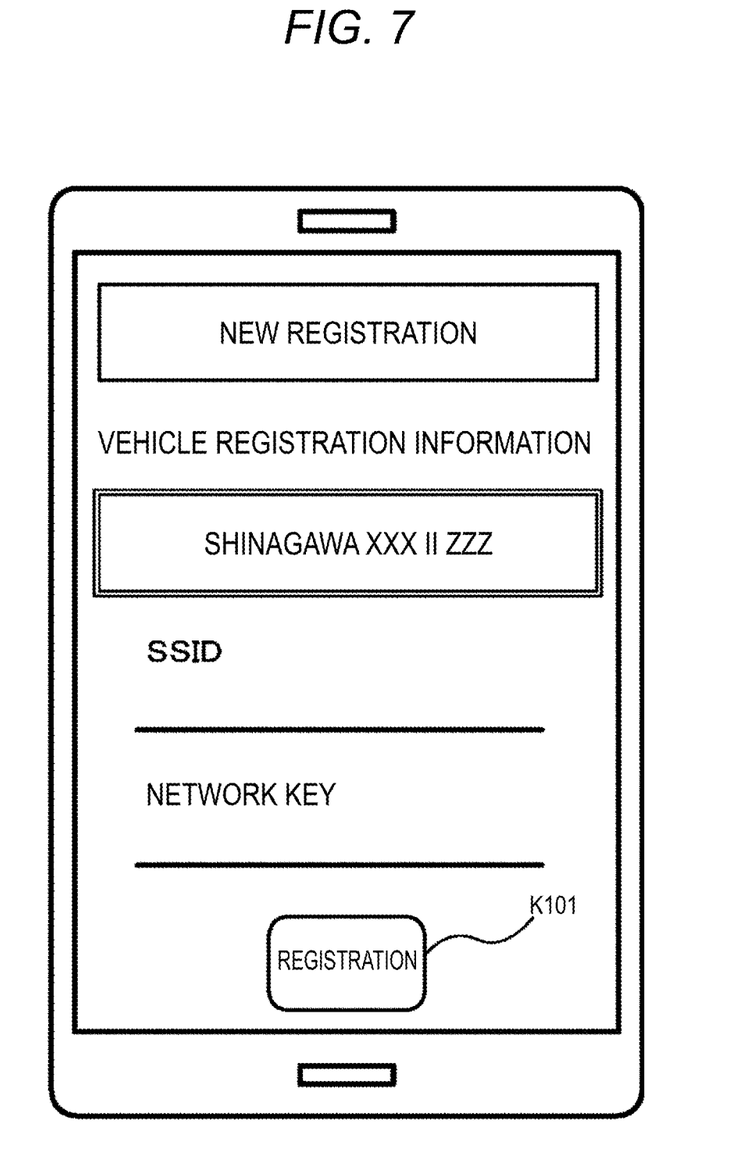
FIG. 7 is a schematic diagram showing an operation screen including an input screen of wireless identification information.

When the determination unit 252 determines that the wireless identification information is not associated with the acquired vehicle registration information, the display control unit 253 causes the display unit 23 to display an operation screen including an input screen of wireless identification information of the in-vehicle wireless device 11 of the vehicle 1 corresponding to the vehicle registration information. For example, the display control unit 253 causes the input screen of the wireless identification information to be displayed before the operation screen shown in FIG. 6 is displayed. FIG. 7 is a schematic diagram showing an operation screen including an input screen of wireless identification information. The user U can input an SSID and a network key as the wireless identification information on the input screen displayed on the display unit 23.

When the wireless identification information is input, the registration information acquisition unit 251 causes the storage unit 24 to store the wireless identification information in association with the vehicle registration information. Next, when the in-vehicle wireless device 11 identified by the input wireless identification information is communicably connected to the inspection assistance apparatus 2, the registration information acquisition unit 251 acquires a vehicle identification number for identifying the vehicle 1 from the in-vehicle wireless device 11. The registration information acquisition unit 251 causes the storage unit 24 to store the acquired vehicle identification number in association with the vehicle registration information and the wireless identification information.

Figure 8:
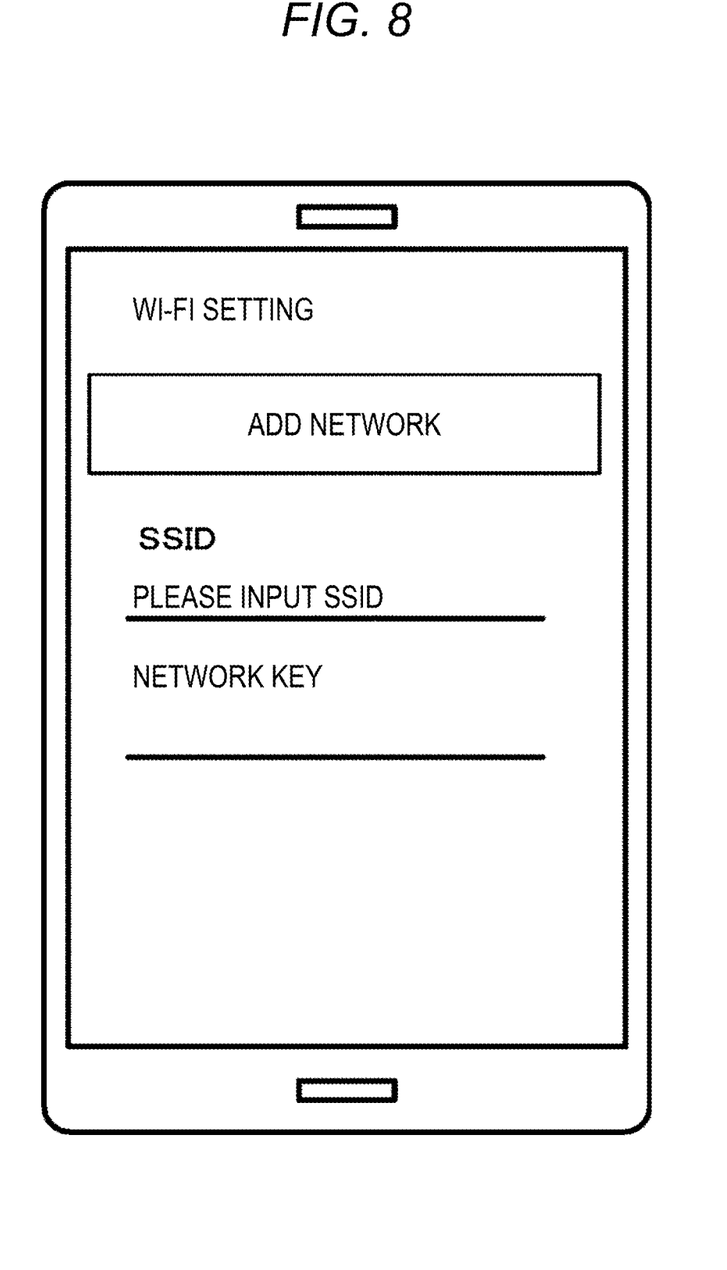
FIG. 8 is a schematic diagram showing an example of a setting screen of a wireless function.

When the wireless identification information is associated with the acquired vehicle registration information and the in-vehicle wireless device 11 indicated by the wireless identification information is not communicably connected to the inspection assistance apparatus 2, the display control unit 253 causes a setting screen of a wireless function of the inspection assistance apparatus 2 to be displayed. Specifically, first, the display control unit 253 causes the display unit 23 to display an operation screen including a wireless setting operation unit for communicably connecting the in-vehicle wireless device 11 and the inspection assistance apparatus 2. The wireless setting operation unit is, for example, a "Wi-Fi setting" key shown in FIG. 6. Next, when the "Wi-Fi setting" key is selected, the display control unit 253 causes the setting screen of the wireless function of the inspection assistance apparatus 2 to be displayed. FIG. 8 is a schematic diagram showing an example of the setting screen of the wireless function. The "Wi-Fi setting" key may be, for example, a link button for executing a Wi-Fi setting function included in an operation system of the inspection assistance apparatus 2 in which the inspection application is installed.

Figure 9:
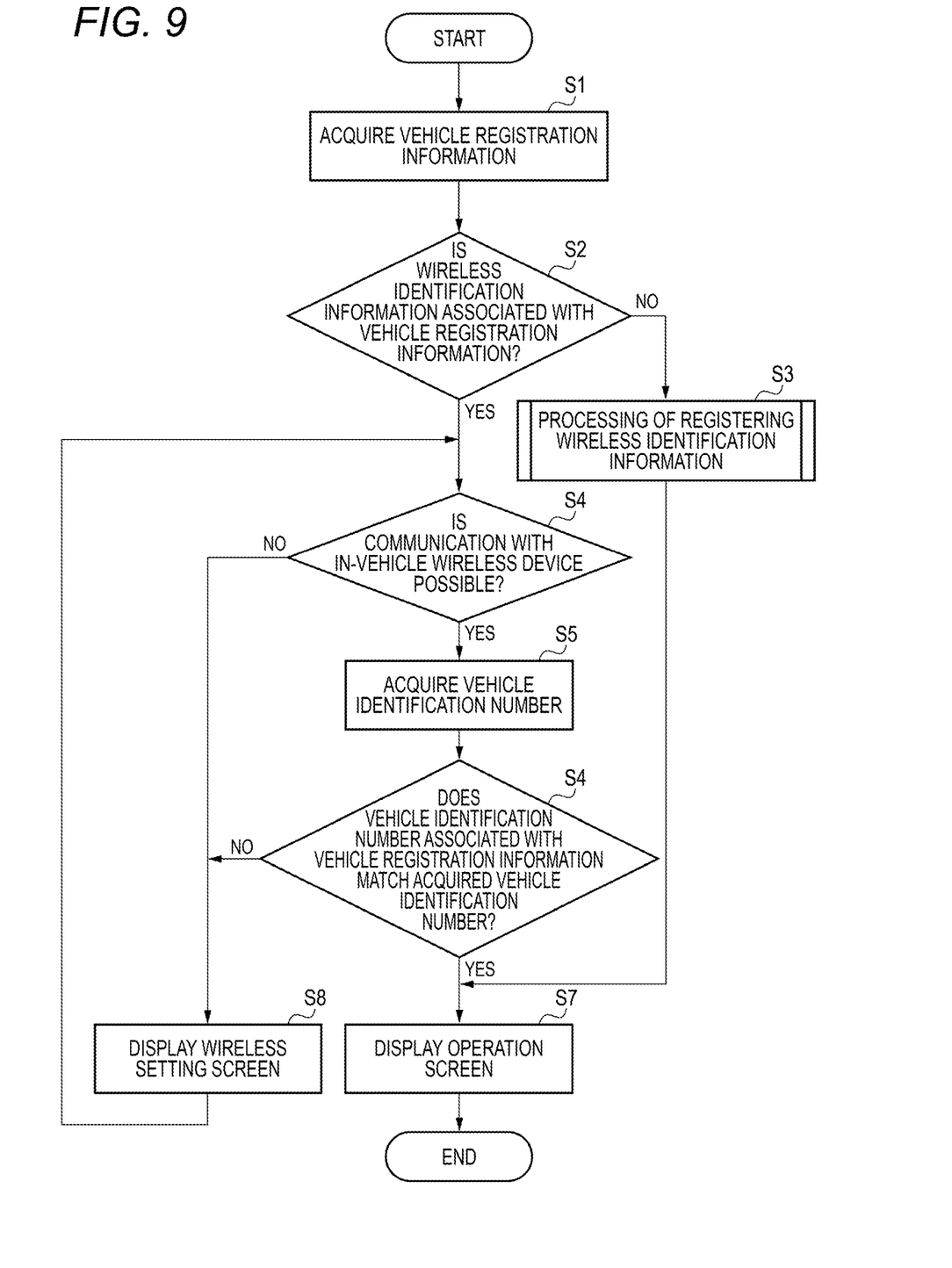
FIG. 9 is a flowchart of a processing executed by the inspection assistance apparatus.

Hereinafter, a flow of a processing executed by the inspection assistance apparatus 2 will be described. FIG. 9 is a flowchart of the processing executed by the inspection assistance apparatus 2. The registration information acquisition unit 251 acquires vehicle registration information corresponding to the vehicle 1 to be inspected (step S1). The determination unit 252 determines whether wireless identification information is associated with the vehicle registration information (step S2). When the wireless identification information is not associated with the vehicle registration information (No in step S2), the inspection assistance apparatus 2 executes a processing of registering the wireless identification information (step S3). The processing of registering the wireless identification information will be described later.

When the wireless identification information is associated with the vehicle registration information (Yes in step S2), the determination unit 252 determines whether the in-vehicle wireless device 11 and the inspection assistance apparatus 2 are communicably connected to each other (step S4). When the in-vehicle wireless device 11 and the inspection assistance apparatus 2 are communicably connected to each other (Yes in step S4), the registration information acquisition unit 251 acquires a vehicle identification number from the in-vehicle wireless device 11 (step S5).

The determination unit 252 determines whether a vehicle identification number associated with the vehicle registration information matches the vehicle identification number acquired by the registration information acquisition unit 251 (step S6). When the vehicle identification number associated with the vehicle registration information matches the acquired vehicle identification number (Yes in step S6), the display control unit 253 causes the display unit 23 to display an operation screen used for inspecting the vehicle 1 (step S7).

Figure 10:
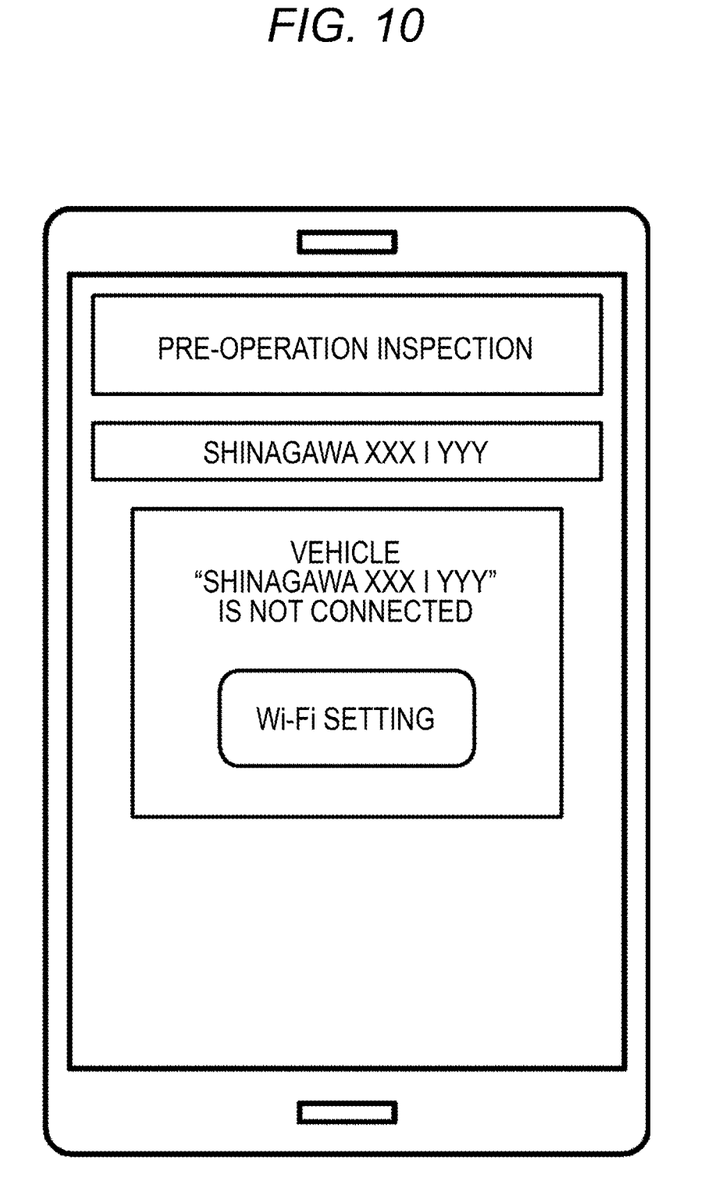
FIG. 10 is a schematic diagram showing an example of a notification screen for notifying that an in-vehicle wireless device is not connected.

When the in-vehicle wireless device 11 and the inspection assistance apparatus 2 are not communicably connected (No in step S4), or when the vehicle identification number associated with the vehicle registration information does not match the acquired vehicle identification number (No in step S6), the display control unit 253 causes the display unit 23 to display a notification screen notifying that the in-vehicle wireless device 11 is not connected (step S8). For example, the display control unit 253 causes a notification screen to be displayed. The notification screen includes information indicating that the in-vehicle wireless device 11 identified by the wireless identification information associated with the selected vehicle registration information is not connected. Further, the display control unit 253 may cause the display unit 23 to display a notification screen including the wireless setting operation unit. FIG. 10 is a schematic diagram showing an example of a notification screen for notifying that the in-vehicle wireless device 11 is not connected.

As described above, the display control unit 253 notifies that the in-vehicle wireless device 11 of the vehicle 1 to be inspected is not connected to the inspection assistance apparatus 2, and causes the notification screen including the wireless setting operation unit to be displayed. Therefore, the user U can understand that it is necessary to connect the in-vehicle wireless device 11 and the inspection assistance apparatus 2 in order to perform inspection. Further, when the user U selects the displayed wireless setting operation unit, the display control unit 253 causes the setting screen of the wireless function to be displayed, so that the user U can quickly perform a setting processing of the wireless function.

Figure 11:
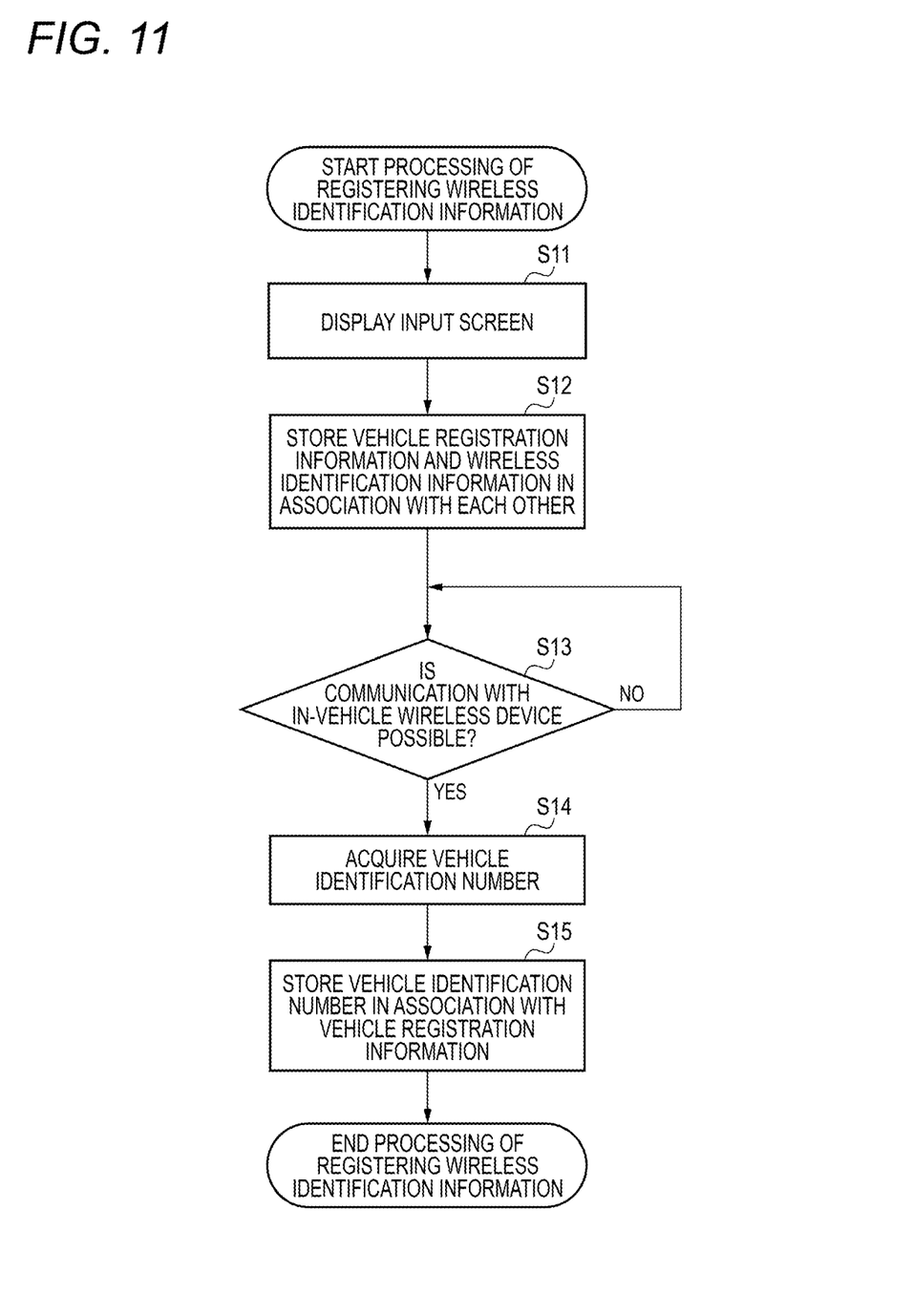
FIG. 11 is a flowchart of a wireless identification information registration processing.

Next, a flow of a processing of registering the wireless identification information executed by the inspection assistance apparatus 2 will be described. FIG. 11 is a flowchart of the wireless identification information registration processing. When the wireless identification information is not associated with the vehicle registration information (No in step S2 of FIG. 9), the display control unit 253 causes an input screen of the wireless identification information corresponding to the vehicle registration information to be displayed (step S11). When the wireless identification information is input, the registration information acquisition unit 251 causes the storage unit 24 to store the wireless identification information in association with the vehicle registration information (step S12).

The determination unit 252 determines whether the in-vehicle wireless device 11 identified by the input wireless identification information and the inspection assistance apparatus 2 are communicably connected to each other (step S13). When the in-vehicle wireless device 11 identified by the input wireless identification information and the inspection assistance apparatus 2 are not communicably connected to each other (No in step S13), the inspection assistance apparatus 2 waits until the in-vehicle wireless device 11 and the inspection assistance apparatus 2 are communicably connected to each other.

When the in-vehicle wireless device 11 identified by the input wireless identification information is communicably connected to the inspection assistance apparatus 2 (Yes in step S13), the registration information acquisition unit 251 acquires a vehicle identification number from the in-vehicle wireless device 11 (step S14). The registration information acquisition unit 251 causes the storage unit 24 to store the vehicle identification number acquired from the in-vehicle wireless device 11 in association with the vehicle registration information and the wireless identification information (step S15). Then, the inspection assistance apparatus 2 ends the processing of registering the wireless identification information.

Modification 1

Figure 12:
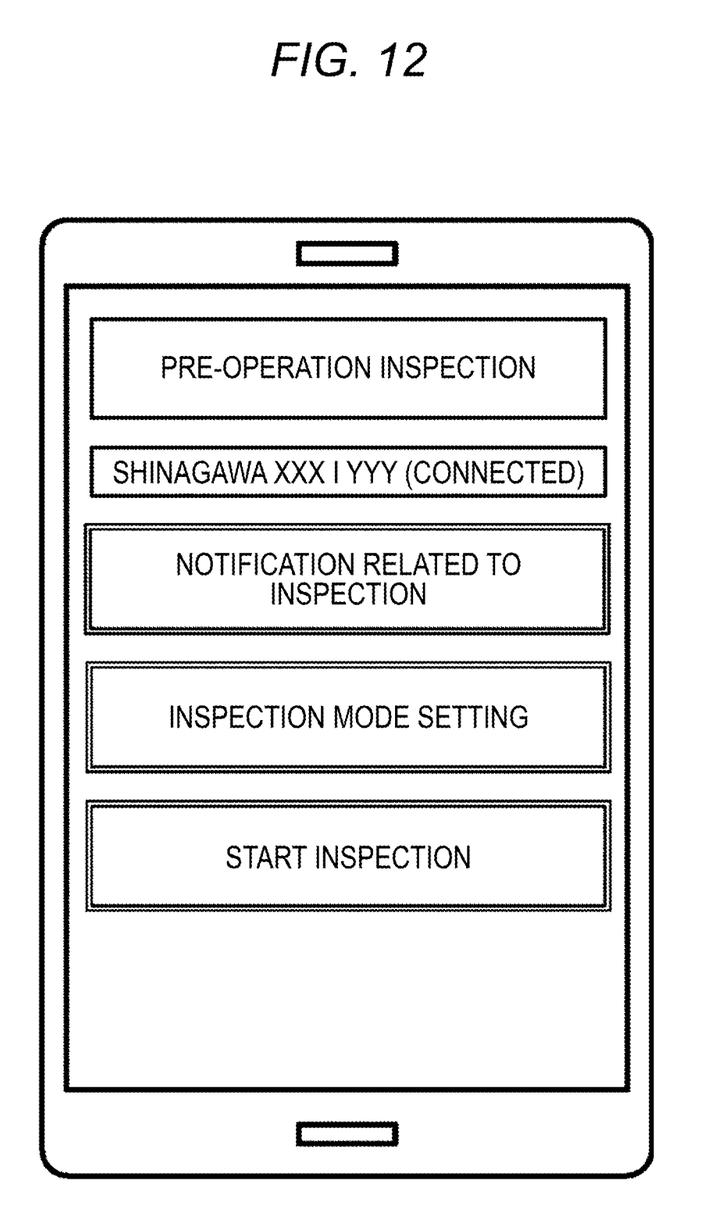
FIG. 12 is a schematic diagram showing an example of an operation screen not including a wireless setting operation unit.

The display control unit 253 may cause an operation screen in a mode corresponding to a connection state between the in-vehicle wireless device 11 and the inspection assistance apparatus 2 to be displayed. Specifically, the display control unit 253 causes the display unit 23 to display an operation screen not including the wireless setting operation unit on condition that the in-vehicle wireless device 11 indicated by the wireless identification information associated with the selected vehicle registration information and the inspection assistance apparatus 2 are communicably connected to each other. Further, the display control unit 253 may cause the display unit 23 to display that the in-vehicle wireless device 11 identified by the wireless identification information associated with the vehicle registration information is connected to the inspection assistance apparatus 2. FIG. 12 is a schematic diagram showing an example of the operation screen not including the wireless setting operation unit. In the example of FIG. 12, the "Wi-Fi setting" key that is the wireless setting operation unit is not displayed.

In the example of FIG. 12, "(connected)" is displayed adjacent to the vehicle registration information "Shinagawa XXX I YYY". As described above, the user U can understand that the in-vehicle wireless device 11 and the inspection assistance apparatus 2 are connected to each other without checking wireless setting by displaying a fact that the in-vehicle wireless device 11 and the inspection assistance apparatus 2 are connected to each other on the operation screen not including the wireless setting operation unit.

Modification 2

The user U may want to change wireless device-specific information of the in-vehicle wireless device 11 of the vehicle 1. Therefore, the inspection assistance apparatus 2 receives input of the wireless identification information, and sets the received wireless identification information in the in-vehicle wireless device 11.

Specifically, first, the display control unit 253 causes the display unit to display a change screen for changing the wireless identification information on condition that the wireless identification information is associated with the vehicle registration information. For example, the display control unit 253 causes the change screen to be displayed when an instruction to change the wireless identification information associated with the vehicle registration information is input. The registration information acquisition unit 251 acquires the input new wireless identification information.

Then, the inspection assistance apparatus 2 transmits, to the in-vehicle wireless device 11, a change instruction that is for changing the wireless identification information and that includes the input new wireless identification information. When receiving the change instruction, the in-vehicle wireless device 11 updates the wireless identification information. When updating the wireless identification information, the in-vehicle wireless device 11 causes the display unit of the vehicle 1 to display the input wireless identification information in an unrecognizable mode. Specifically, the in-vehicle wireless device 11 causes a character (for example, an asterisk) different from the updated network key to be displayed at a position where the network key of the in-vehicle wireless device 11 is displayed on the display unit of the vehicle 1. Then, the in-vehicle wireless device 11 transmits information indicating that the update of the wireless identification information has been completed to the inspection assistance apparatus 2. When receiving the information indicating that the update is completed from the in-vehicle wireless device, the registration information acquisition unit 251 causes the input wireless identification information to be stored in association with the vehicle registration information. In this way, the user U can change the wireless identification information of the in-vehicle wireless device 11 of the vehicle 1.

Modification 3

The inspection assistance system S is not limited to the above description, and may include an inspection management apparatus capable of communicating with the inspection assistance apparatus 2. The inspection management apparatus has at least a part of functions of an inspection application. The inspection management apparatus is, for example, a server managed by a business operator who inspects the vehicle 1. Further, the inspection management apparatus may have all functions of the inspection application. In this case, a display control unit of the inspection management apparatus causes the inspection assistance apparatus 2 of the user U who inspects the vehicle 1 to display various pieces of information. Specifically, the display control unit of the inspection management apparatus causes the inspection assistance apparatus 2 to display an operation screen created in a mode determined based on a determination result of whether wireless identification information for identifying the in-vehicle wireless device 11 of the vehicle 1 is associated with the vehicle registration information.

[Effects of Inspection Assistance Apparatus 2]

As described above, the inspection assistance apparatus 2 acquires the vehicle registration information corresponding to the vehicle 1 to be inspected, and determines whether the acquired vehicle registration information and the wireless identification information for identifying the in-vehicle wireless device 11 of the vehicle 1 are associated with each other. Then, the inspection assistance apparatus 2 displays the operation screen created in the mode determined based on a determination result. In this way, since the user U can see the operation screen in accordance with whether the vehicle registration information and the wireless identification information are associated with each other, it is easy to check whether it is necessary to perform the setting work of the wireless function before the vehicle 1 is inspected. Therefore, the inspection assistance apparatus 2 can improve efficiency of the inspection work performed by the user U.

When the in-vehicle wireless device 11 and the inspection assistance apparatus 2 are connected to each other, the inspection assistance apparatus 2 determines whether the vehicle identification number associated with the vehicle registration information matches the vehicle identification number acquired from the connected in-vehicle wireless device 11. In this way, when an in-vehicle wireless device of a vehicle different from the vehicle 1 to be inspected is connected to the inspection assistance apparatus 2, the inspection assistance apparatus 2 can prevent the user U from performing inspection corresponding to an inspection item of the vehicle different from the vehicle 1 to be inspected.

Although the present disclosure has been described above using the embodiment, the technical scope of the present disclosure is not limited to the scope described in the above embodiment, and various modifications and changes can be made within the scope of the gist of the present disclosure. For example, all or some of the apparatuses can be functionally or physically distributed or integrated in any unit. Further, a new embodiment generated by any combination of a plurality of embodiments is also included in the embodiment of the present disclosure. Effects of the new embodiment generated by the combination include effects of the original embodiment.

The present application is based on a Japanese Patent Application Japanese Patent Application No. 2019-110526, filed on Jun. 13, 2019, and contents of which are incorporated herein by reference.

INDUSTRIAL APPLICABILITY

An inspection assistance program, an inspection assistance system, and a control method for an inspection assistance apparatus according to the present disclosure can improve efficiency of inspection work by assisting inspection of a vehicle.

REFERENCE SIGNS LIST

S: inspection assistance system
1: vehicle
11: in-vehicle wireless device
12: various lamps
13: various sensors
14: ECU
141: storage unit
142: control unit
2: inspection assistance apparatus
21: communication unit
22: operation unit
23: display unit
24: storage unit
25: control unit
251: registration information acquisition unit
252: determination unit
253: display control unit
U: user

The invention claimed is:

1. A non-transitory computer readable medium storing an inspection assistance program for assisting inspection of a vehicle, the program causing a processor of a computer to:
acquire vehicle registration information corresponding to the vehicle;
determine whether wireless identification information for identifying an in-vehicle wireless device of the vehicle is associated with the vehicle registration information; and
cause to display an operation screen that is created in a mode determined based on a determination result and that is used for inspecting the vehicle by communicating with the in-vehicle wireless device,
wherein the processor causes to display the operation screen having an input screen of the wireless identification information when it is determined that the wireless identification information is not associated with the vehicle registration information, and
wherein, when the processor causes to display an inspection item to be inspected by changing a state of equipment of the vehicle, the state of the equipment corresponding to the inspection item to the vehicle being changed upon receipt of instructions from the processor.

2. The non-transitory computer readable medium according to claim 1, wherein the processor acquires a vehicle identification number for identifying the vehicle from an in-vehicle wireless device when the in-vehicle wireless device identified by the input wireless identification information and the computer are communicably connected to each other.

3. The non-transitory computer readable medium according to claim 1, wherein the processor causes to display the operation screen having a wireless setting operation for communicably connecting the in-vehicle wireless device and the computer.

4. The non-transitory computer readable medium according to claim 3, wherein the processor causes to display the operation screen which does not have the wireless setting operation when the in-vehicle wireless device and the computer are communicably connected to each other.

5. The non-transitory computer readable medium according to claim 1, wherein the processor causes to display the change screen for the changing the wireless identification information when the wireless identification information is associated with the vehicle registration information.

6. An inspection assistance system for assisting inspection of a vehicle comprising:
a processor coupled to a memory storing instructions, the processor being configured to:
acquire vehicle registration information corresponding to the vehicle;
determine whether wireless identification information for identifying an in-vehicle wireless device of the vehicle is associated with the vehicle registration information; and
cause an information terminal of a user who inspects the vehicle to display an operation screen that is created in a mode determined based on a determination result of the determination and that is used for inspecting the vehicle by communicating with the in-vehicle wireless device,
wherein the processor causes to display the operation screen having an input screen of the wireless identification information when it is determined that the wireless identification information is not associated with the vehicle registration information,
wherein, when the processor causes to display an inspection item to be inspected by changing a state of equipment of the vehicle, the state of the equipment corresponding to the inspection item to the vehicle being changed upon receipt of instructions from the processor.

7. A control method for assisting inspection of a vehicle, the control method comprising:
causing a processor to execute:
acquiring vehicle registration information corresponding to the vehicle;
determining whether wireless identification information for identifying an in—
vehicle wireless device of the vehicle is associated with the vehicle registration information; and
causing to display an operation screen that is created in a mode determined based on a determination result of the determination and that is used for inspecting the vehicle by communicating with the in-vehicle wireless device,
wherein the processor causes to display the operation screen having an input screen of the wireless identification information when it is determined that the wireless identification information is not associated with the vehicle registration information,
wherein, when the processor causes to display an inspection item to be inspected by changing a state of equipment of the vehicle, the state of the equipment corresponding to the inspection item to the vehicle being changed upon receipt of instructions from the processor.

* * * * *